United States Patent
Rouvinen et al.

(10) Patent No.: US 6,710,950 B2
(45) Date of Patent: Mar. 23, 2004

(54) PIEZOELECTRIC ACTUATOR FOR DIGITAL CAMERA OPTICAL SYSTEM

(75) Inventors: Jarkko Rouvinen, Espoo (FI); Ilpo Kauhaniemi, Helsinki (FI); Pentti Ahlgren, Helsinki (FI); Stefan Johansson, Uppsala (SE); Christer Mattsson, Norrtalje (SE)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 10/163,111

(22) Filed: Jun. 5, 2002

(65) Prior Publication Data

US 2003/0227559 A1 Dec. 11, 2003

(51) Int. Cl.[7] .......................... G02B 7/02; G02B 15/14; H04N 5/232; G03B 17/00; H01L 41/08
(52) U.S. Cl. .................. 359/824; 359/822; 359/823; 359/814; 359/696; 359/698; 348/357; 396/79; 310/332
(58) Field of Search ................. 359/822, 823, 359/824, 814, 696, 697, 698; 348/357, 358, 349, 335; 396/79; 310/332, 328, 369

(56) References Cited

U.S. PATENT DOCUMENTS

| | | | | |
|---|---|---|---|---|
| 5,101,278 A | * | 3/1992 | Itsumi et al. | 348/357 |
| 5,633,763 A | * | 5/1997 | Suzuki et al. | 359/822 |
| 5,675,444 A | * | 10/1997 | Ueyama et al. | 359/824 |
| 6,437,485 B1 | * | 8/2002 | Johansson | 310/332 |

* cited by examiner

Primary Examiner—Loha Ben
(74) Attorney, Agent, or Firm—Perman & Green, LLP

(57) ABSTRACT

A support for an optical system of a digital camera is constructed which provides adjustable positioning of the lens elements in response to signals from the camera control processor. The support comprises multiple tubes, mounted for relative coaxial movement, which support a lens element. At least one of the tubes is adjustable in position relative to a main support tube. The adjustable tube is engageable by piezoelectric elements. Each piezoelectrical element is mounted to a flexible printed circuit board which contains the camera operating system and is mounted on the support tube.

62 Claims, 16 Drawing Sheets

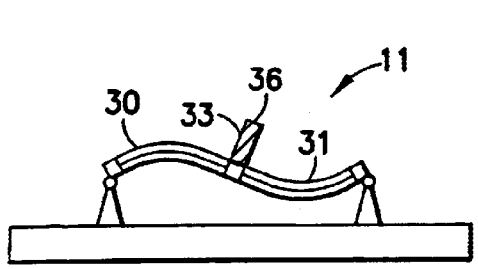
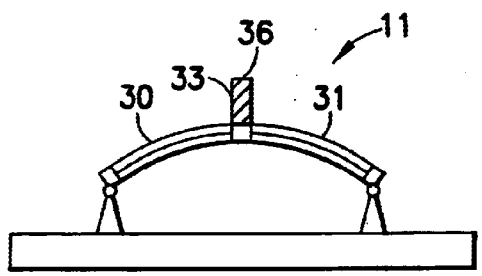
FIG.4a   FIG.4b
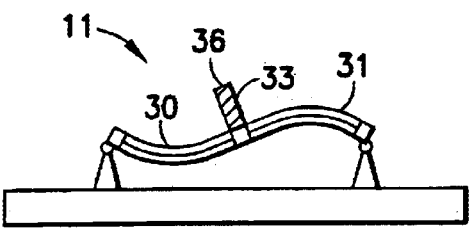
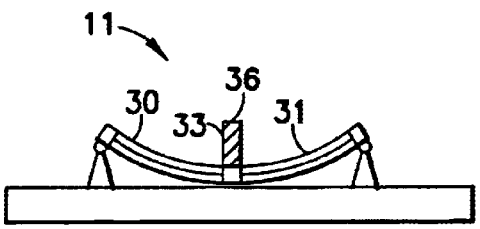
FIG.4c   FIG.4d
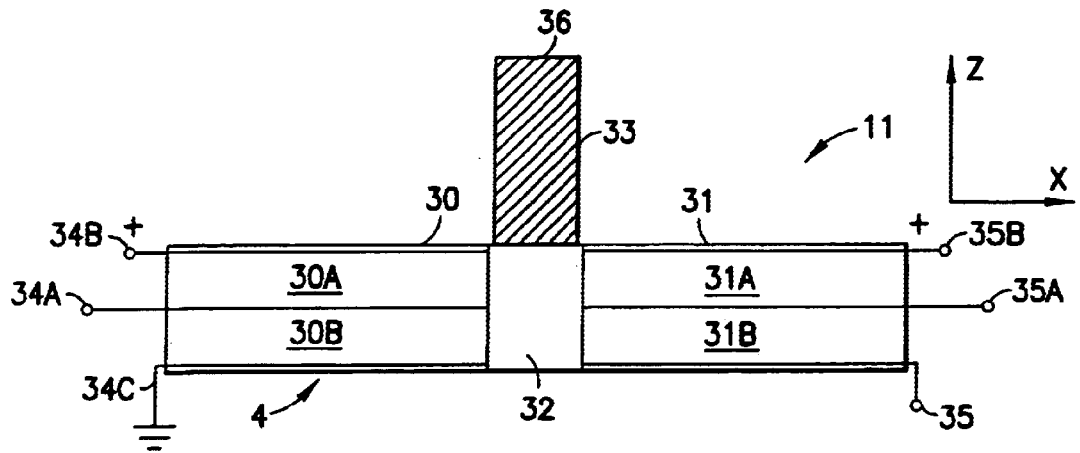
FIG.4e

PIEZOELECTRIC ACTUATOR FOR DIGITAL CAMERA OPTICAL SYSTEM

TECHNICAL FIELD

The present invention relates generally to a mechanism for moving the lens elements of an electronic camera.

BACKGROUND OF THE INVENTION

The components of electronic cameras require low power consumption, low weight and cost efficiency. These design criteria are challenged by the demand for optically adjustable cameras that provide autofocus, zoom optics, or both. These features require the relative movement of optical elements to provide the adjustment. The required motion is typically linear but may use a rotating motor combined with a motion-converting mechanism such as a lead-screw. The motion range is often in the order of millimeters. It is a purpose of this invention to provide a mechanism for adjusting the position of the optical elements in an electronic camera.

One component that has been used in numerous applications is a bimorph piezoelectric element, such elements are constructed of multiple layers of piezoelectric material wherein each layer is connected for independent excitation. In U.S. Pat. No. 4,291,958, a bimorph piezoelectric cantilever beam is used in combination with a magnifying lever for focusing a camera. However, the necessary stroke of such a focusing device results in a poor stiffness of the device. In electronic camera applications, space is a crucial factor. There is thus a need for simple drive elements that can operate in narrow spaces with limited mechanical support. It is a purpose of this invention to utilize a bimorph piezoelectric element to adjust the position of a lens in an optical system of a digital camera.

SUMMARY OF THE INVENTION

A miniaturized digital camera is constructed for use with a mobile communication device or other compact appliance. The optical system of such a camera may consist of a small lens assembly having single or multiple lens components. The optical system transmits the image received from an external source to a sensor array which converts the optical signal to a digital signal for processing. In multiple lens configurations, the lenses in the optical system are moved in relation to each other to provide autofocus and zoom capability.

In the simplest of applications a single primary lens may be provided with sufficient movement to provide autofocus in accordance with the sensed location of the subject. For simplicity the subject invention is first described with reference to a single adjustable lens application, although multiple lens configurations may be constructed utilizing multiple drive mechanisms as disclosed in this application.

According to this invention, a lens element is mounted within a camera on a tubular member. The lens tube is in turn mounted on a support tube for movement along the longitudinal axis of the tubular member. The adjustment movement is provided by means of multiple bimorph piezoelectric elements, for example by three elements, spaced symmetrically around the circumference of the support tube. The piezoelectric elements are connected to and mounted on a flexible printed circuit board which may contain other electronic components associated with the lens drive system. The flexible printed circuit board is mounted on the support tube and is in turn connected to a voltage source such as a battery. The flexibility of the printed circuit board allows it to be formed to the shape of the support tube and for the piezoelectric element to be positioned in engagement with the lens tube.

The bimorph piezoelectric element used in the subject mechanism is constructed of at least two layers of piezoelectric material which are independently energized to provide relative deformation between the two layers. The piezoelectric element used in the system of one embodiment of this invention is formed in the shape of a beam having an engagement pad extending transverse to the plane of the element from its midpoint. The beam is fixed to the circuit board close to ends or nodal positions. The outer end of the engagement pad is free to move in operative association with the movable lens tube. In the preferred embodiment, the beam comprises a pair of bimorph piezoelectric elements extending to either side of the engagement pad. Each of the bimorph elements have dual active layers. The differential deformation generated by energizing only one of the two layers will cause the piezoelectric elements to bend, moving the outer end of the engagement pad into contact with the movable lens tube. By altering the excitation of the piezoelectric elements, the engagement pad causes movement in an axial direction, thereby adjusting the position of the lens. A pattern of excitation is devised to provide movement in discrete steps.

A processor is connected in the printed circuit board to provide the main control for the digital camera and is constructed to generate a drive voltage pattern in accordance with the desired movement of the lens.

The movement generated by the piezoelectric element provides a high resolution, but there are no structural features that provide a reference in order to obtain accurate repeatability. The step length provided by the piezoelectric element can vary with operational and environmental conditions. In order to obtain the precision required in some optical designs, a position sensor is used to monitor the position of the movable tubes. An optical sensor is used to view a reflecting surface which is mounted on the moveable tube. The reflecting surface consists of a gray-scale incorporated into the surface treatment of the moveable tube. This configuration will provide accurate positional monitoring of a moveable tube.

In a second embodiment of this invention a pair of lenses are used to provide a zoom function. In this embodiment the moveable tube is divided into a front lens support section and rear lens support section and each of the sections is driven separately by piezoelectric elements in a manner similar to that described above. If the application warrants, an optical sensor can be provided to monitor the position of both sections.

Further embodiments can be constructed which combine the autofocus and zoom functions.

In this manner a miniature drive system is provided to move the lens within the camera while using a minimum of power and space.

BRIEF DESCRIPTION OF THE DRAWINGS

The invention is described in more detail below with reference to the accompanying drawings, in which:

FIGS. 4a–4e are enlarged views of the piezoelectric element shown in FIGS. 1 and 2 at various conditions of excitation;

DETAILED DESCRIPTION OF THE INVENTION

Figure 1:
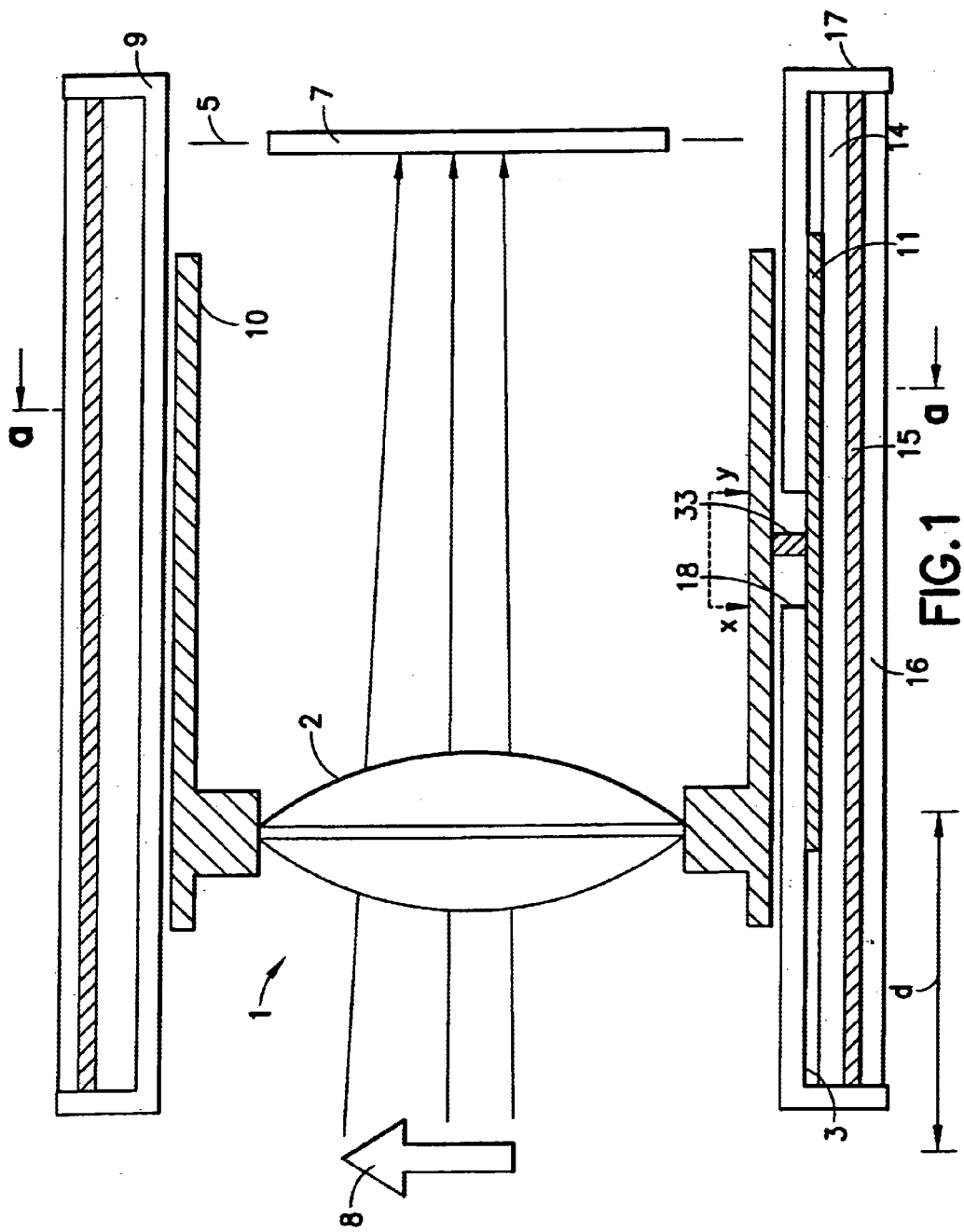
FIG. 1 is a schematic view of a simple optical system for use in a digital camera in accordance with the preferred embodiment of this invention.
Figure 3:
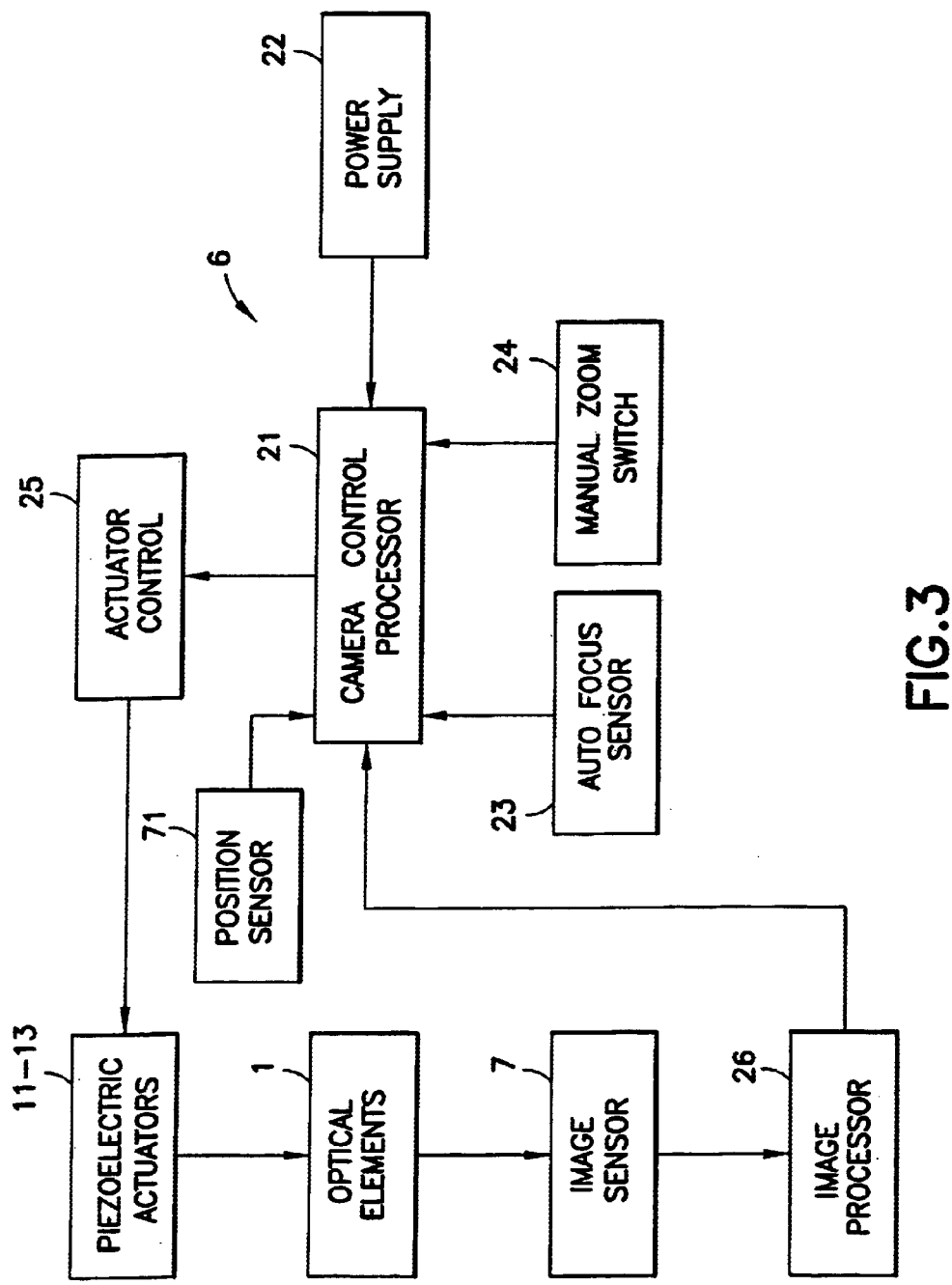
FIG. 3 is a block diagram of a control system for a digital camera according to a preferred embodiment of this invention.
Figure 5:
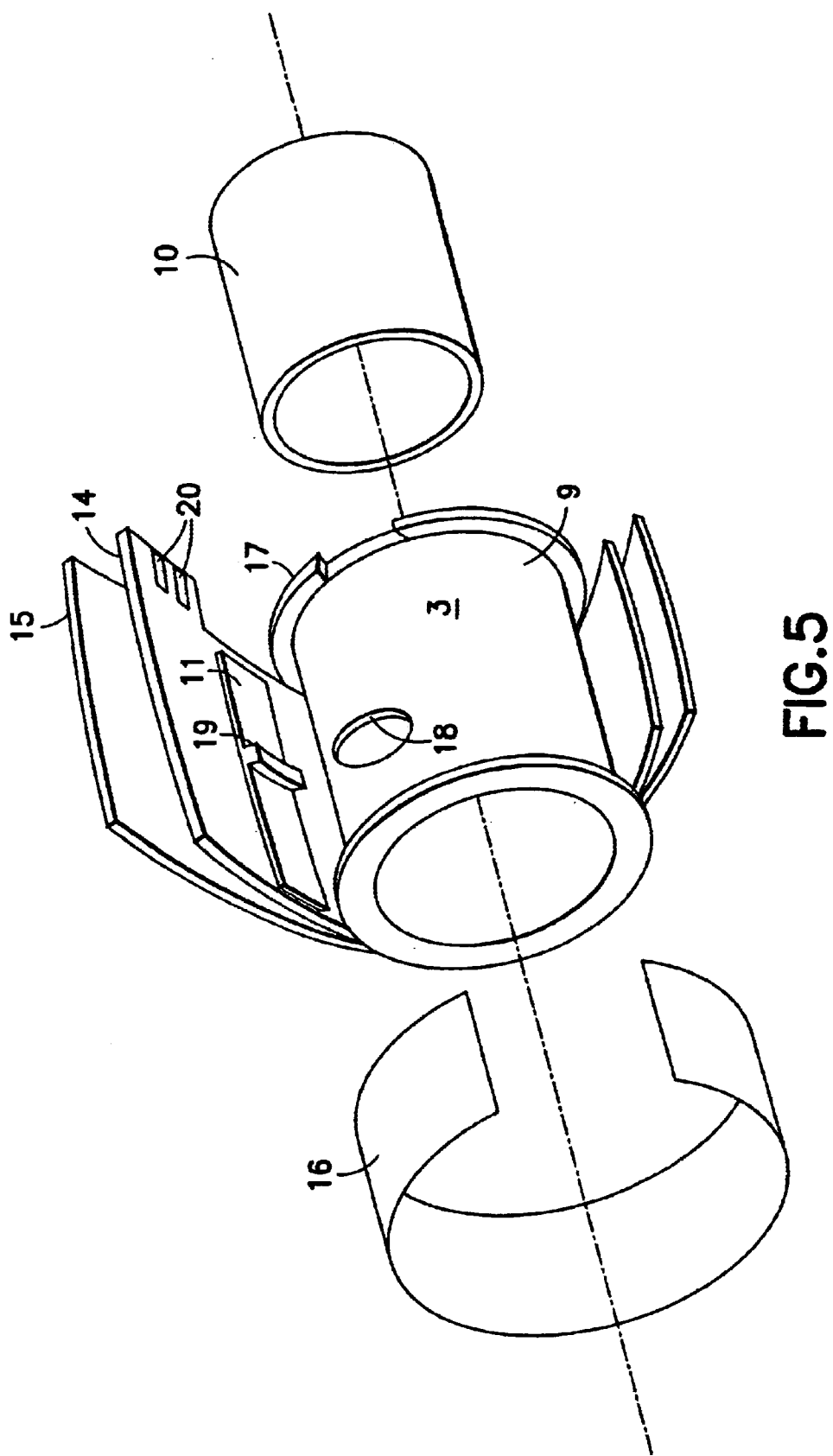
FIG. 5 is an exploded perspective view of the components of the optical system of this invention.
Figure 9A:
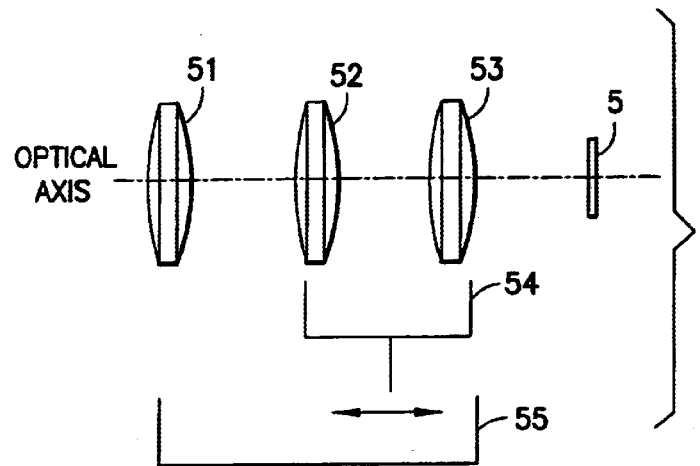
FIGS. 9a and 9b are schematic diagrams of possible optical systems having moveable lens modules to provide both autofocus and zoom capabilities.
Figure 9B:
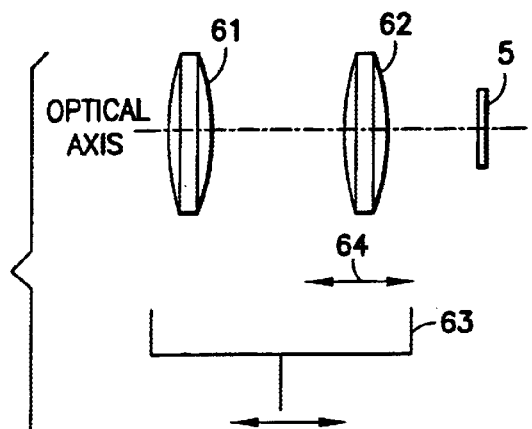
Figure 11:
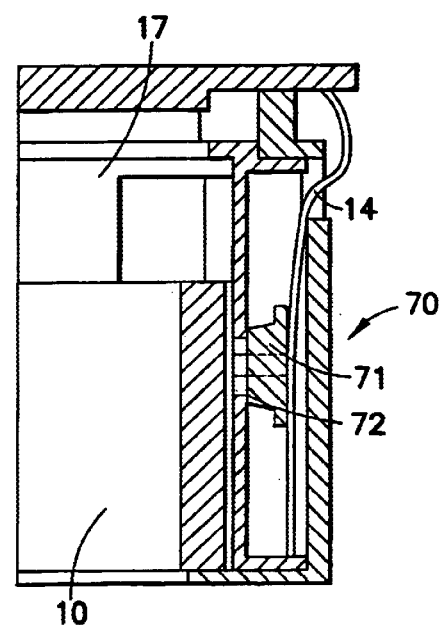
FIG. 11 is a schematic cut away view of an alternate embodiment of an optical system showing the use of a position sensor according to this invention.

A typical optical lens system 1 for a camera having an autofocus capability is depicted schematically in FIG. 1. It generally will consist of a primary lens 2, which operates to project a focused image of subject 8 on image plane 5. As shown, the primary lens 2 is adjustable in the range x–y. Lens system 1 is used in a digital camera system 6, as shown in FIG. 3. Lens system 1 is secured within a housing (not shown) to project an image on an image sensor 7 positioned at the image plane 5 of the camera system 6. The primary lens 2 is adjustable to obtain an autofocus function. The single adjustable lens configuration is chosen for ease of illustration. It should be recognized that multiple lens adjustment could be obtained to provide a zoom capability. Examples of such systems are shown in FIGS. 9a and 9b. In the latter instances, multiple piezoelectric drive groups may be constructed to provide independent adjustment motion of the autofocus and zoom lenses.

Figure 2:
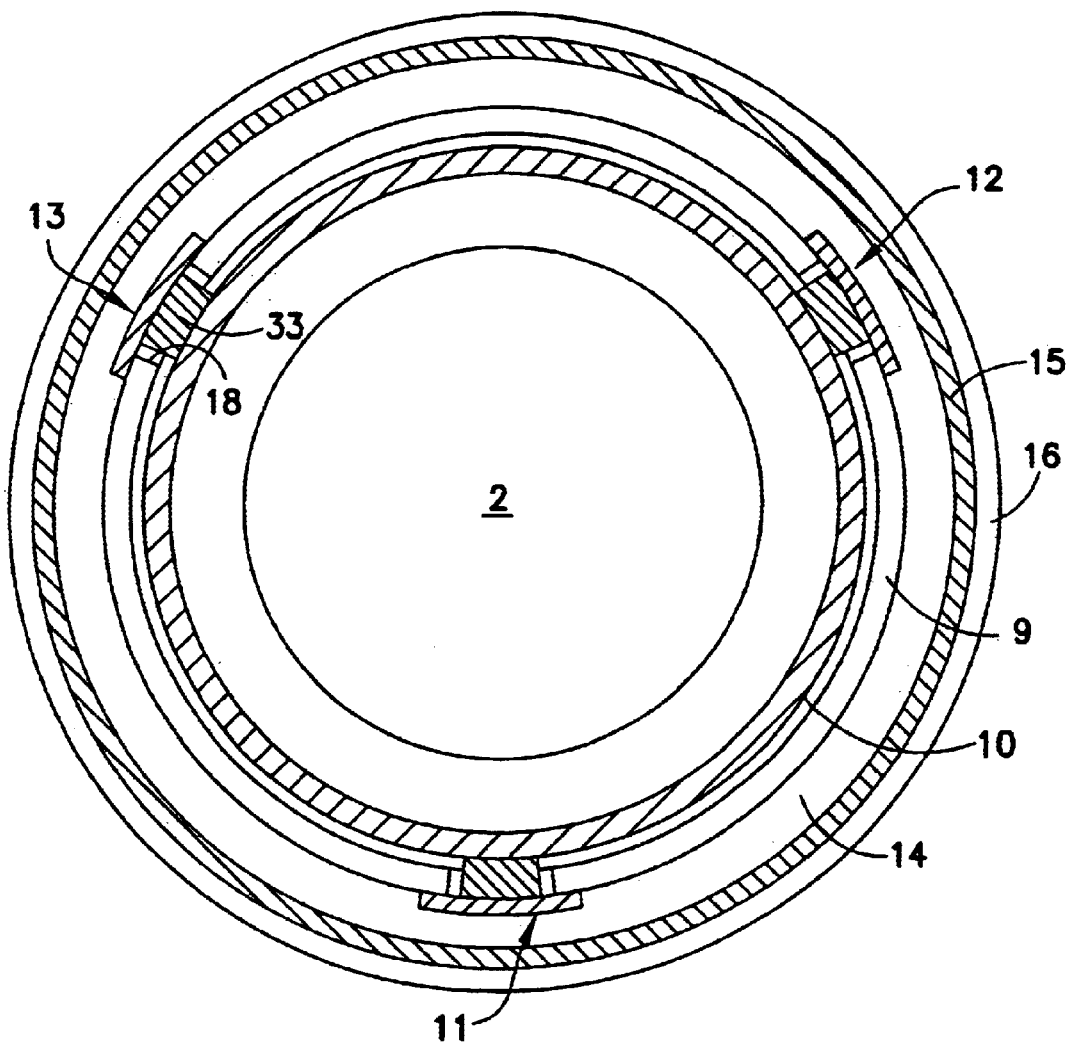
FIG. 2 is a sectional view of the optical system of this invention shown in FIG. 1, taken along section lines a—a.

The lens assembly 1, as shown in FIG. 1, consists of a support tube 9 and a lens tube 10. Lens tube 10 holds the lens 2 and is mounted coaxially within support tube 9. Lens tube 10 is adjustable to provide an autofocus capability for the camera system 6. To provide. the necessary adjustment, lens tube 10 is supported within the support tube 9 for movement in an axial direction. Support and motion for the lens tube 10 is provided by multiple bimorph piezoelectric elements 11, 12, and 13, as shown in FIGS. 1 and 2. The lens tube can be driven by two or even one element if there is no need for high axial forces.

Figure 12A:
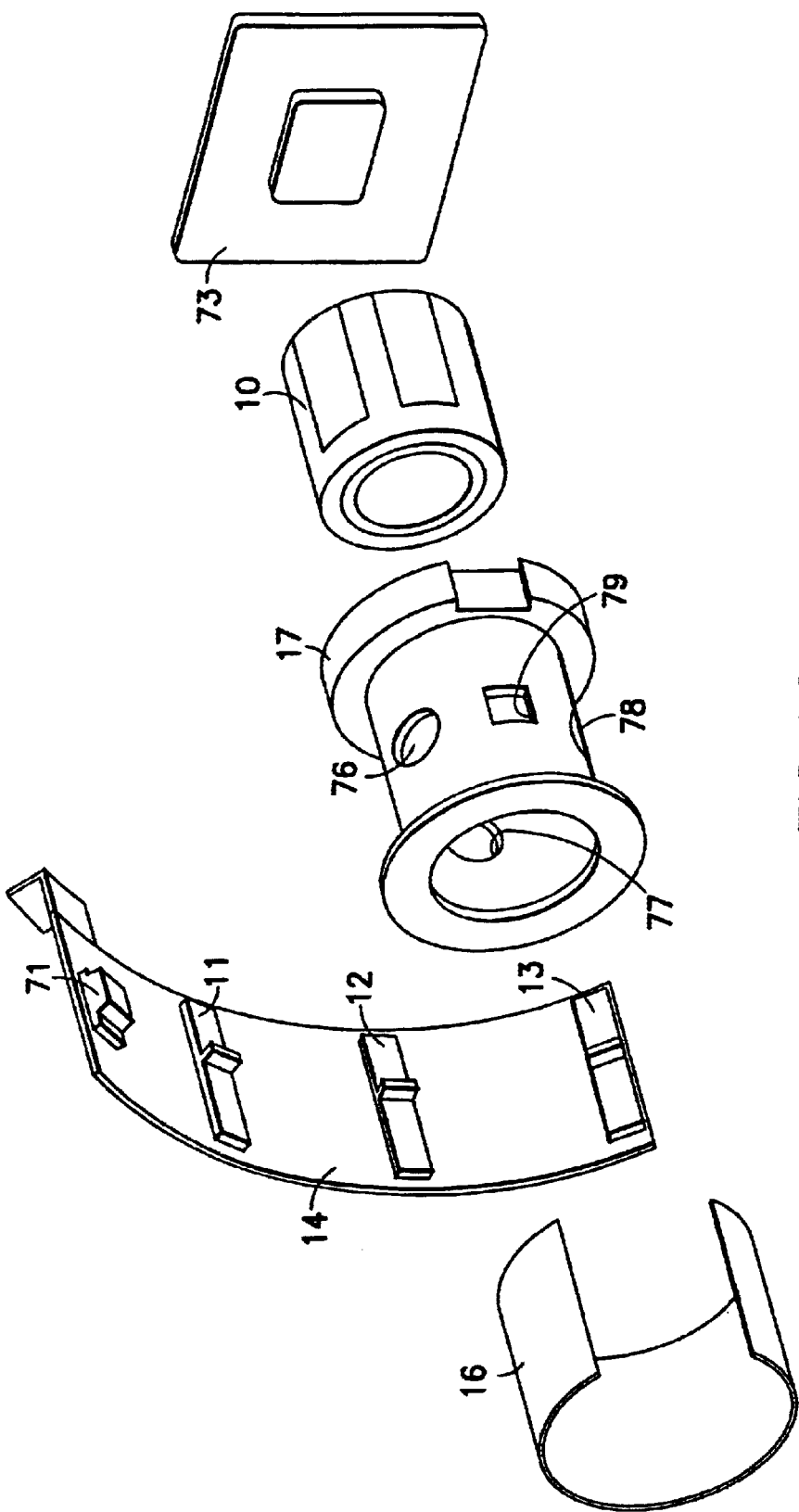
FIG. 12a is an exploded view of the basic elements of the alternate embodiment of FIG. 11.
Figure 12B:
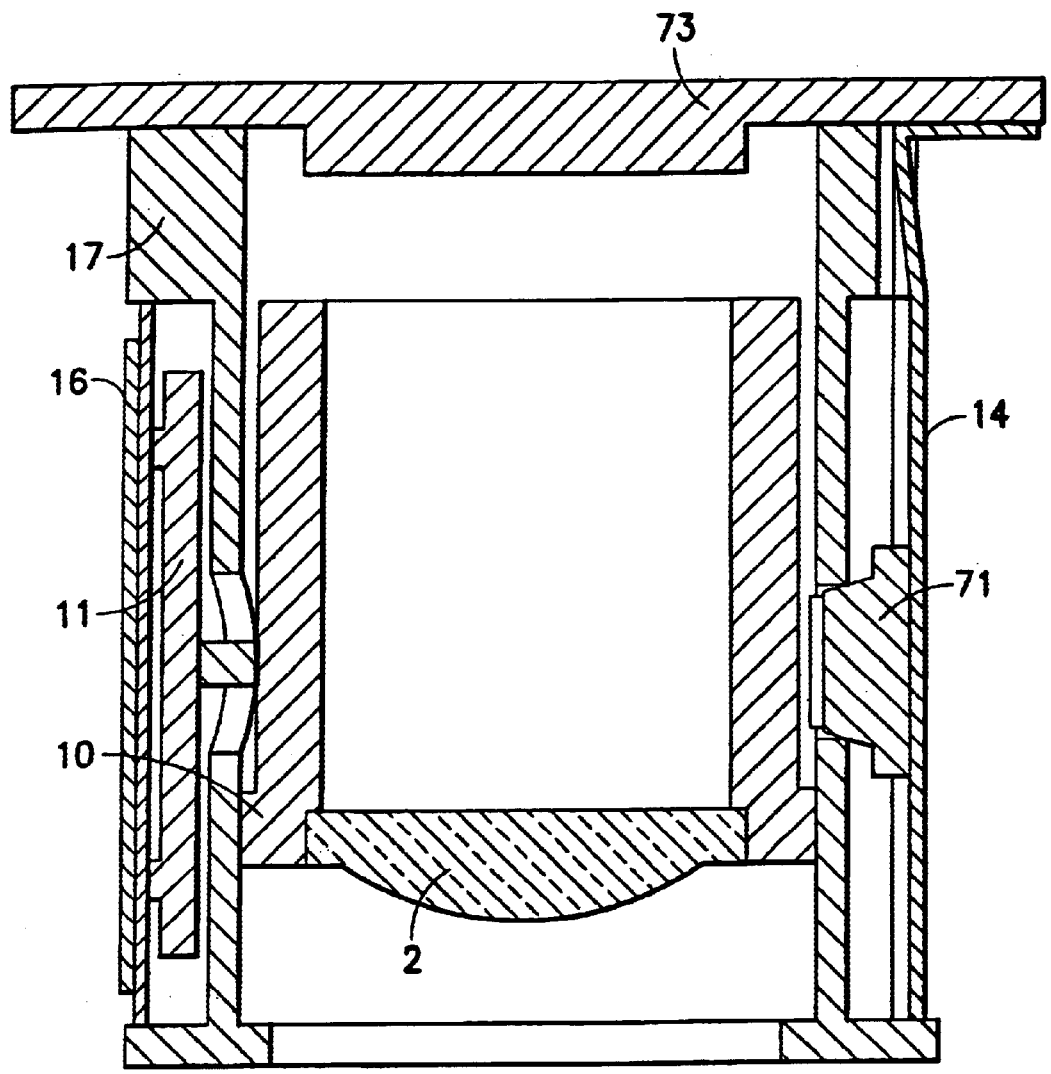
FIG. 12b is a sectional view of the assembled embodiment of FIG. 12a, along an axial section line.
Figure 12C:
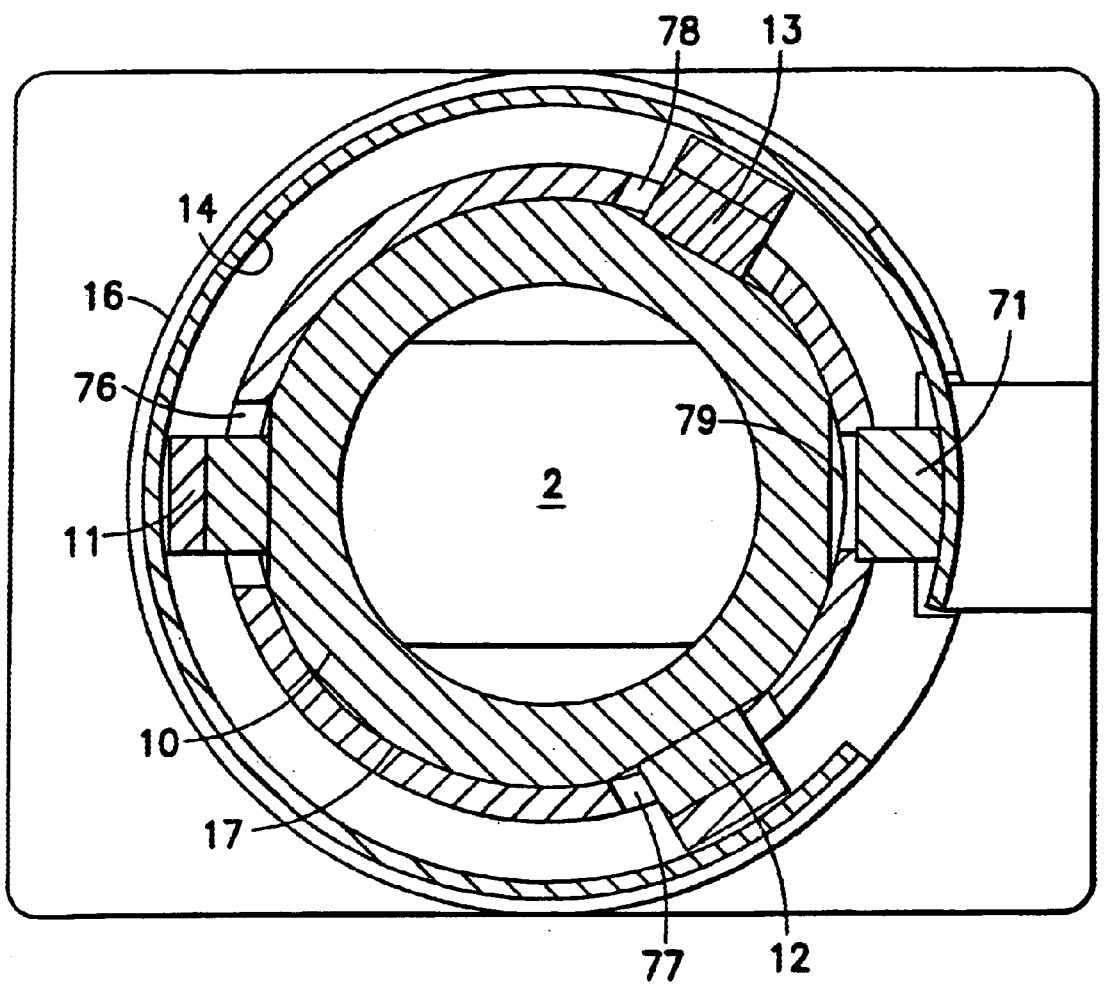
FIG. 12c is a sectional view of the assembled embodiment of FIG. 12a, along a section line transverse to the axis of the device.

The circuit board for the piezoelectric drive is a flexible printed circuit board 14 arranged about the outer cylindrical surface 15 of the support tube 9. The piezoelectric elements 11–13 and their associated components are connected and supported directly by the flexible circuit board 14. The image processing and related elements of the camera system 6, as shown in FIG. 3, are connected and supported by a separate printed circuit board, such as shown at reference number 73 in FIG. 12. A power supply 22, such as a battery, will be connected to printed circuit boards 14 and 73 in a well known manner. A resilient insulating sheet 15 is wrapped around flexible circuit board 14. The assembly of flexible circuit board and insulating sheet 15 is held in place on support tube 9 by a split ring shaped spring 16. Damping sheet 15 and spring 16 may be eliminated by incorporating these functions into the construction of flexible circuit board 14. Contacts 20 are formed on flexible circuit board 14 to provide means to connect the flexible circuit board 14 a power supply 22. Sheet 15 provides a resilient damping of the piezoelectric distortion within the assembly while allowing the necessary flexing and the damping of acoustic noise.

As illustrated in FIGS. 1 and 2, the piezoelectric elements are mounted on the flexible circuit board 14 on the outer periphery of the support tube 9. Elements 11–13 are identical and each is constructed with a pair of elements 30 and 31, as shown in FIG. 4e. Element 11 is formed by bimorph sections 30 and 31 which are connected to form a beam by a passive member 32 at the midpoint of the beam. An engagement pad 33 extends outward from the passive member 32 transverse to the longitudinal axis of the beam. Bimorph section 30 is constructed of dual piezoelectric volumes 30A and 30B which are both active and connected to flexible circuit board 14 though contacts 34. Each volume could consist of several layers connected and polarized to act as one piezoelectric layer. This reduces the necessary driving voltages. It is also possible to use only one piezoelectric volume in each bimorph section if the corresponding deformation is sufficient. Similarly section 31 is constructed of dual piezoelectric layers 31A and 31B connected to flexible circuit board 14 though contacts 35. Engagement pad 33, in the assembled condition, is aligned with an opening 18 in support tube 9 to allow engagement of the outer engagement end 36 of pad 33 with the lens support tube 9.

The piezoelectric elements 11–13 are excited in accordance with a predetermined pattern to cause the attachment levers 33 of elements 11–13 to engage the lens tube 10 and adjust its axial position. The amount of this adjustment will be in accordance with a signal from an autofocus sensor 23 which senses the distance d of the subject 8. Using appropriate algorithms, it is possible to obtain the auto-focus setting data directly from the image sensor, thereby eliminating the need for a separate sensor element. In the event that multiple lens movement is provided to allow a zoom function, a manual zoom control 24 is provided to signal the camera control processor to cause movement, for example, of a zoom lens as shown in FIG. 9a. The camera system 6 consists of a primary control processor 21 which receives power from power supply 22 to drive the components of the system 6. Adjustment signals are provided by autofocus sensor 23 which senses the distance d of the subject from the optical system 1.

The camera control processor 21 generates a signal and sends it to an actuator control processor 25. The actuator control processor 25 generates a predetermined control voltage pattern to cause the piezoelectric elements to deform in response to signals from the camera control processor 21. The voltage pattern is designed to cause movement of the adjustable lens tube 10 in the axial direction in the amount indicated by the autofocus sensor 23. The optical elements project the image of subject 8 onto the image sensor 7 located at the focal plane 5 of the camera system 6. Image sensor 7 generates a signal indicative of the image which is projected. The image signal is converted to a digital signal in image processor 26. The digital image signal is stored in a memory section of camera control processor 21.

Figure 10:
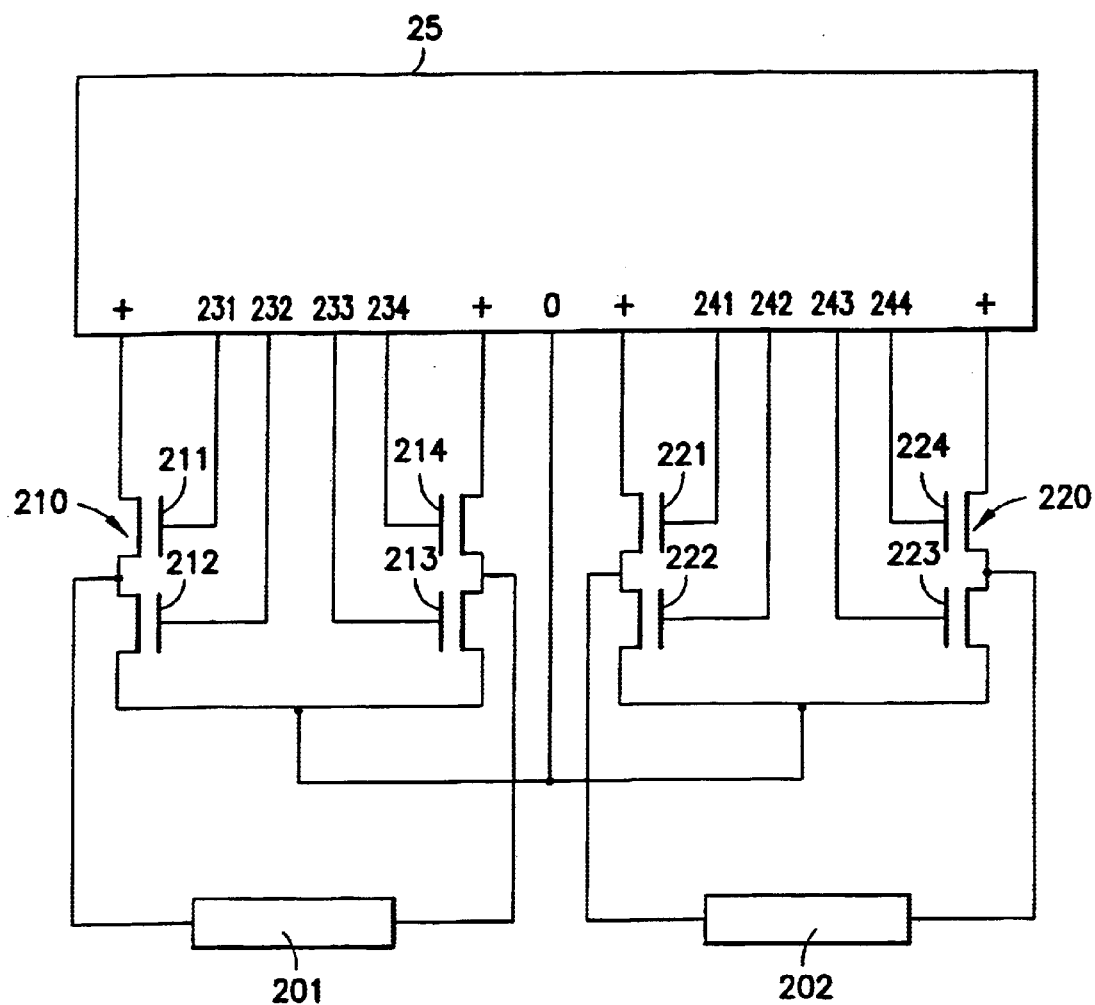
FIG. 10 is a schematic drawing of a circuit for driving a bimorph piezoelectric element.

An example of actuator control processor 25 is shown in the circuit diagram of FIG. 10. The circuit shown is designed to control two piezoelectric volume elements 201 and 202. By driving an output bridge 210, comprising transistors 211, 212, 213, 214, to control piezoelectric element 201 and another separate bridge 220, comprising the transistors 221, 222, 223, 224, to control another piezoelectric element 202. The transistors of bridges 210 and 220 can be either bipolar or Field Effect (FET) devices or a combination thereof. Bridge 210 is controlled by bridge control signals 231, 232, 233, 234 and bridge 220 is controlled by signals 241, 242, 243, 244. The transistors of the bridges 210 and 220 can either be discrete or integrated in the control circuit. 0 indicates circuit ground and + indicates the supply bus. In operation the half bridge, comprising transistors 211 and 212, can be controlled by the bridge control signals 231, 232 to output any voltage between 0 and + and the other half bridge, comprising transistors 213, 214, of bridge 210 can be controlled by the bridge control signals 233, 234 to output a complementary voltage.

Thus the full supply bus voltage can be applied over the element 201 either way. The control signals 231, 232, 233, 234 can also easily be arranged to completely switch off all transistors in bridge 210. In the same way the controller 25 can control the bridge 220 to output a voltage either way over the element 202 or keep the element 202 unconnected. All needed volume element movements can be implemented by the controller 25 by separately controlling two or more elements at the same time.

FIG. 4a–4e show a double bimorph piezoelectric element 11 which is constructed to engage lens tube 10 to adjust the axial position of lens tube 10. As previously described, the element 11 and its associated elements 12 and 13 are each constructed in the same manner. In each of the elements 11, a pair of bimorph elements 30 and 31 are mechanically connected through passive part 32 to form a beam 4. Each of the sections are constructed similarly, therefore only one is described herein. The bimorph section 30 comprises two active volumes 30A and 30B separated by a middle electrode 34A. The upper active volume 30A is shown as a single layer, but may have multiple layers. Similarly, the lower active volume 30B may comprise a number of piezoelectric layers, but only one is shown for simplicity. The bottom electrode (34C) of active volume 30B is connected to GND in one embodiment. In other embodiments all electrodes (34A–C, 35A–C) can be controlled individually. If a soft piezoelectric material, i.e. a material that is easy to polarize, is used, the upper electrode of active volume 30A is connected to a voltage higher than the peak voltage applied to signal electrode 34A. If a hard piezoelectric material is used, a polarization opposite to the electric field can be used and the upper electrode can be connected to ground.

By applying a voltage between selected electrodes, the active volumes 30A and 30B can be excited individually. By applying a voltage over the active volume 30A, the piezoelectric layer expands in the electrical field direction, i.e. each layer becomes thicker, if the electric field and polarization have the same direction, however, at the same time, the active volume 30A will contract in the longitudinal direction. This contraction and expansion is related to the characteristic coefficients of the piezoelectric material chosen. If the active volume 30A is unaltered as active volume 30B is excited, the decreased length of the active volume 30B will cause the bimorph piezoelectric section 30 to distort and bend upwards as shown in FIG. 4a. By reversing this excitation in section 31, the opposite distortion is obtained which will result in the distortion of the beam 4 as illustrated in FIG. 4a. A pattern of excitation and distortion is derived to provide steps of motion, as shown in FIGS. 4a–d. These steps can be repeatedly activated by appropriate signals.

The bimorph element 11, as shown in FIG. 4e, is comprised of two adjacent piezoelectric beams or sections 30 and 31 separated by passive part or member 32. There are three points of contact for the element 11 one close to either end of the combined beams and another at the engagement end 36 of pad 33. In order to allow the necessary distortion of the beam sections and overall beam that comprises element 11, the ends of the beam should be flexibly mounted to the flexible circuit board 14 to provide a degree of rotation at the corresponding contact points.

There are, therefore, four independent active volumes, 30A, 30B, 31A and 31B that make up beam 4. Dynamic excitation of one to four of the four active volumes provides motion of the engagement pad 33 in both the z and the x directions. By exciting the active volumes in cooperation the motions illustrated in FIGS. 4a–4d are obtained. Note that all motions of the piezoelectric element are exaggerated in the figures, in order to illustrate the motion principles. At ultrasonic frequencies this provides an elliptic type of motion of the engagement pad 33, which will cause a movement of the lens support tube in the X direction.

Piezoelectric actuating elements of this type are described in copending U.S. application Ser. No. 09/739,906, filed Dec. 20, 2000. The disclosure of this application is incorporated herein in its entirety by reference.

Figure 6:
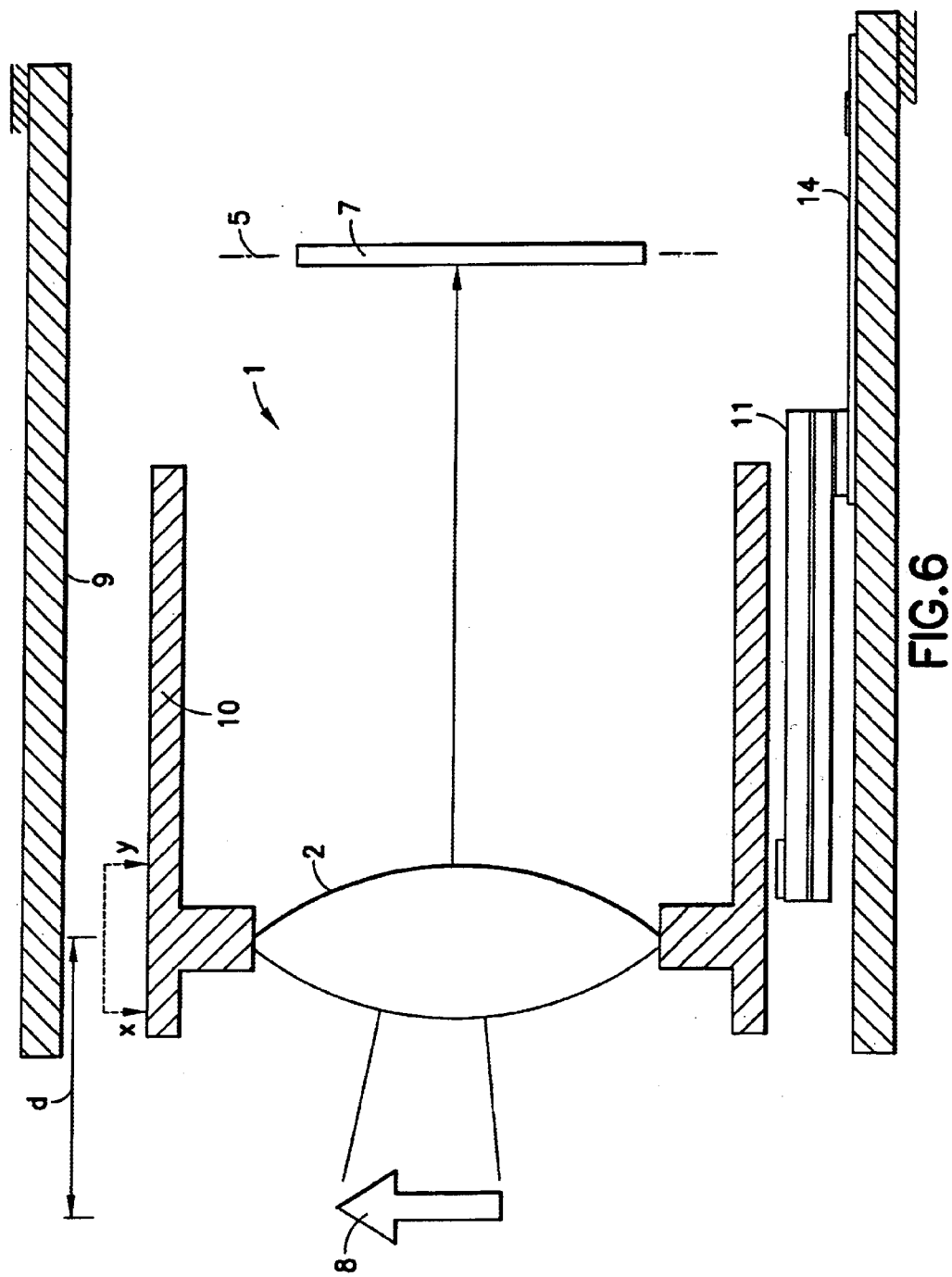
FIG. 6 is a schematic view of an alternate embodiment of the optical system of this invention.
Figure 7:
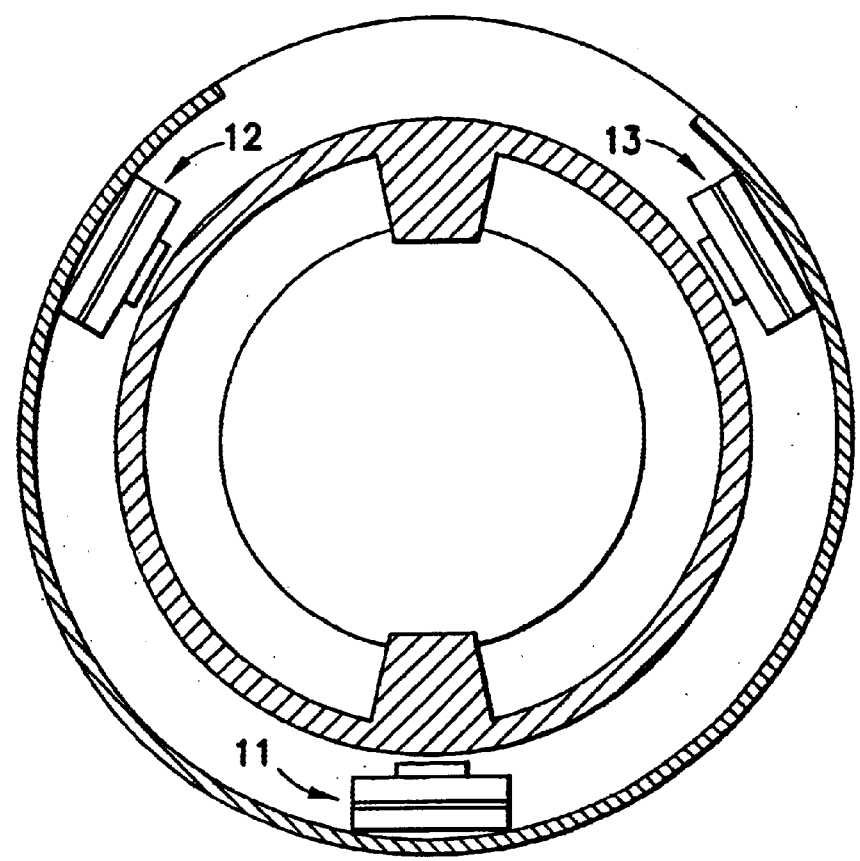
FIG. 7 is an end view of the optical system of this invention as shown in FIG. 6.
Figure 8:
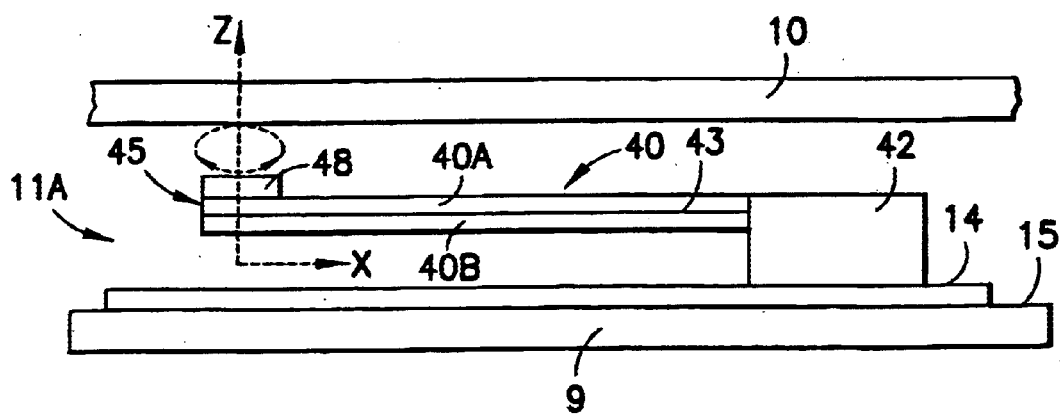
FIG. 8 is a schematic illustration of a alternate embodiment of a piezoelectric element for use in the embodiment of FIGS. 6 and 7.

In an alternate embodiment as shown in FIGS. 6–8, the piezoelectric element 11A comprises a cantilevered beam having two active volumes 40A and 40B supported by passive part 42 which is mounted on flexible circuit board 14. The piezoelectric element 11A has at least two parallel active volumes 40A and 40B. Each of the active volumes 40A and 40B comprises at least one piezoelectric layer. The active volumes 40A and 40B can be activated individually by electrodes 43 (only one is illustrated in the figure) arranged in parallel with the active volumes 40A and 40B. At the moveable tip 45 of the piezoelectric element 11A is an engaging surface 48, which is brought into contact with the adjustable tube 10 during operation of the autofocus function of camera system 6. flexible circuit board 14 supports the element 11A at the passive part 32 and is connected to electrodes 43 through appropriate means (not shown). In this embodiment, the flexible circuit board 14 is fixed to the interior surface 15 of the support tube 9. Support tube 9 is fixed within the body of the camera system 6 (not shown).

By applying the same voltage on both volumes 40A and 40B, the element 11A can be caused to contract in the axial direction. By combining different voltages on the respective volumes 40A and 40B the actuating surface 48 can be moved in a two-dimensional space (X and Z), as illustrated by the elliptical path shown in FIG. 8. In order to move adjustable tube 10, the element 11A is forced to bend against it for frictional engagement. A different excitation of the active volumes 40A and 40B can be accomplished to provide an expansion of the element 11A which will provide movement of the adjustable tube 10 in the opposite axial direction.

In either embodiment, by deriving a pattern of voltage signals to be applied to electrodes of piezoelectric element 11, a desired pattern of movements can be obtained which are consistent with the desired function. The particular motion performed is responsive to the signals from the camera control processor 20.

Figure 15:
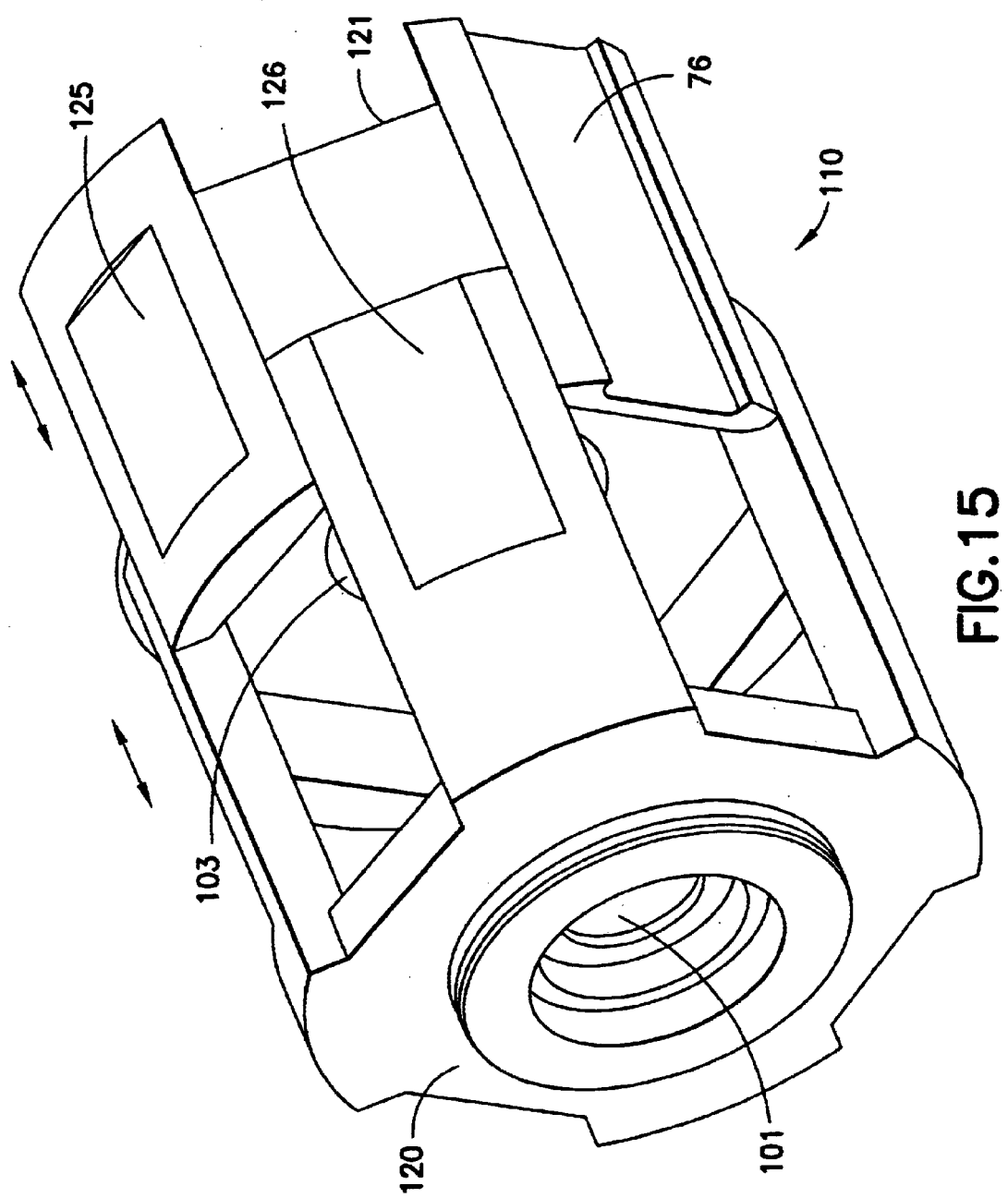
FIG. 15 is a perspective schematic view of the moveable tube of the embodiment of FIG. 13.
Figure 16:
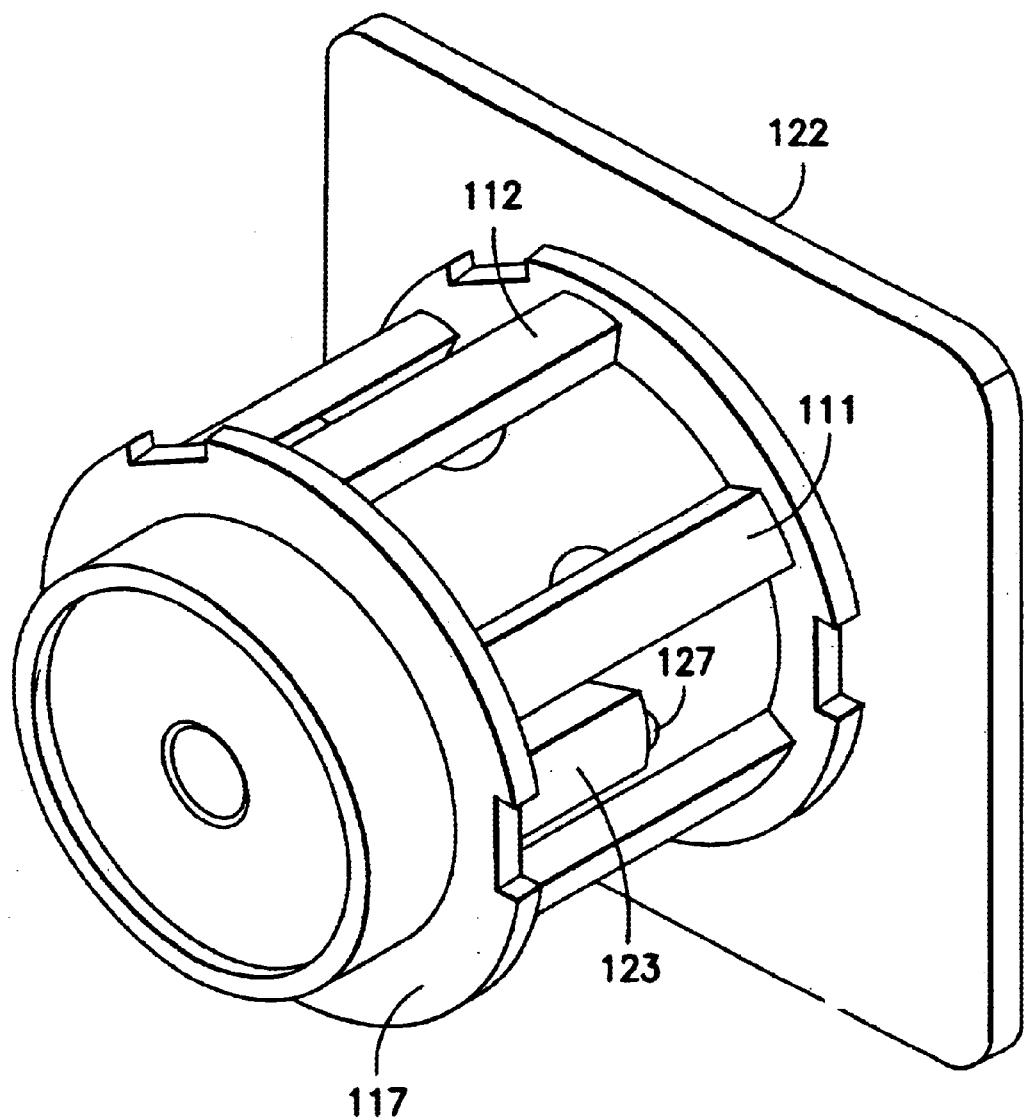
FIG. 16 is a perspective schematic view of the support tube of the optical system of this invention with a position monitor.

In order to obtain the precision required in some optical designs, a position sensor 70 is used to monitor the position of the movable tubes, as shown in FIGS. 11 and 12a–c. The optical system of this embodiment includes support tube 17 and moveable lens tube 10 as previously described. These components are mounted directly on printed circuit board 73 by holder 74 (see FIG. 11). Printed circuit board 73 contains the image sensor 7, image processor 26 and related components (not shown). An optical sensor 71 is mounted and connected to flexible circuit board 14 and is used to view a reflecting surface 76 mounted on the moveable tube 10. Optical sensor 71 may be a commercially available, subminiature, reflective type, photointerrupter, such as model GP2S60, available from Sharp Microelectronics of the Americas, Camas, Wash. Optical monitor 70 includes a reflecting surface 76 as shown in the embodiment of FIG. 15, which consists of a gray-scale incorporated into the surface treatment of the moveable tube. In FIG. 15, the reflecting surface 76 is shown in the rear section 120 of moveable tube 110. The assembly of this embodiment also includes flexible circuit board 14 wrapped around support tube 17 and held in place by spring element 16. Piezoelectric elements 1–13 are mounted on flexible circuit board 14 in a position to enable the engagement pads of these elements to engage the lens tube 10 through openings 76–78 in support tube 17. Visual access for position sensor 71 is provided by port 79 in support tube 17. This configuration will provide accurate monitoring of a moveable tube in a wide variety of embodiments. An appropriate opening must be provided in the intervening components of optical system 1 to enable the optical sensor 51 to have visual access to the moveable tubes 10 or 110 (in FIG. 13).

The piezoelectric drive systems described above can be readily adapted to move multiple lenses either through an appropriate linkage system to a single drive or by independent multiple drives to provide the required adjustability for both autofocus and zoom capabilities. FIGS. 9a and 9b show two possible lens configurations for providing autofocus and zoom. In the system of FIG. 9a, a primary lens 51 is mounted on a support tube for movement relative to focal plane 5, a zoom assembly is provided which consists of a pair of lenses 52 and 53. The zoom lenses are mounted for movement relative to the primary lens 51 and focal plane 5. The zoom pair is also mounted for movement with the primary lens for focus adjustment. This system is designed to use a piezoelectric drive for the primary lens support movement which would include the zoom components and a second drive to provide movement of the zoom lenses relative to the primary lens support.

Figure 13:
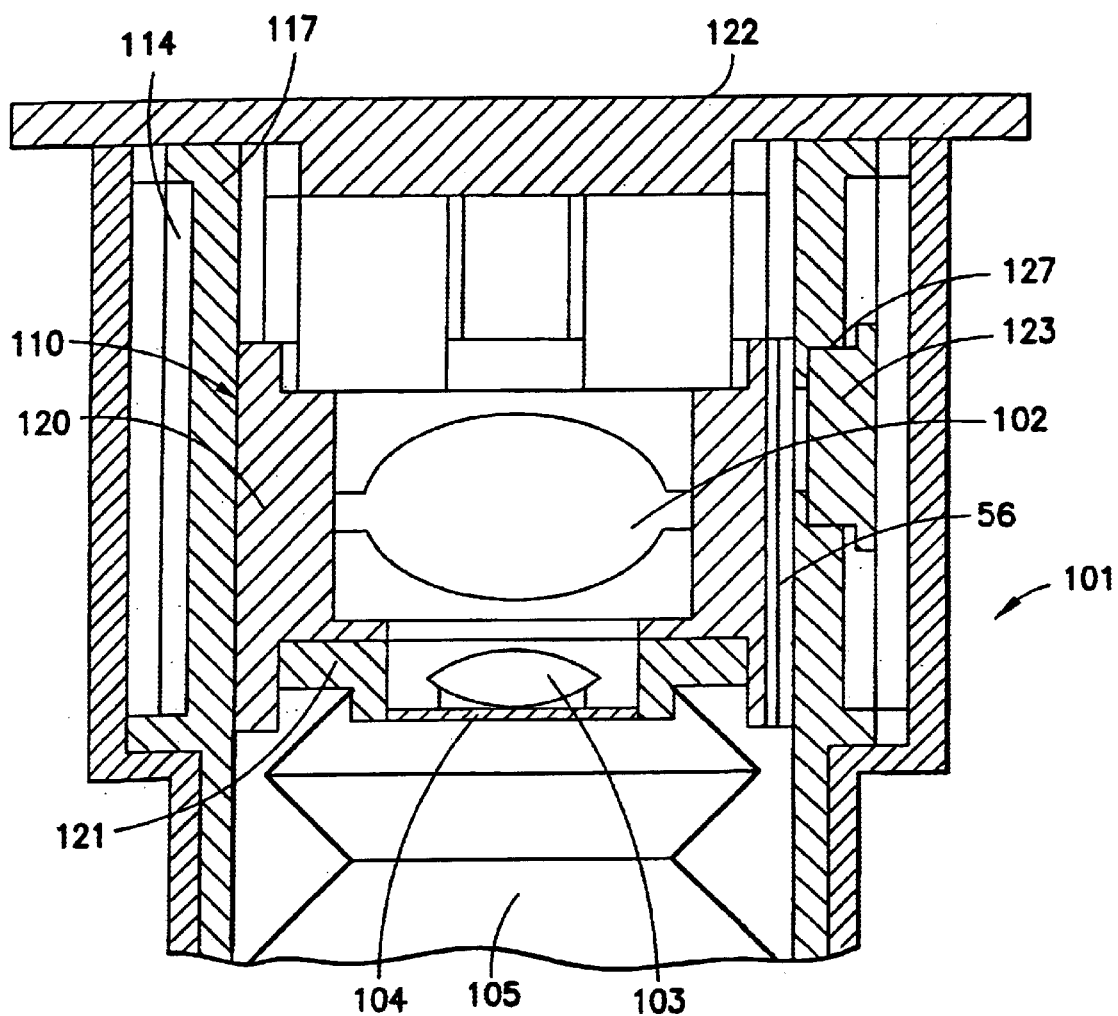
FIG. 13 is a schematic cut away view of a further alternative embodiment of. the optical system of this invention.
Figure 14A:
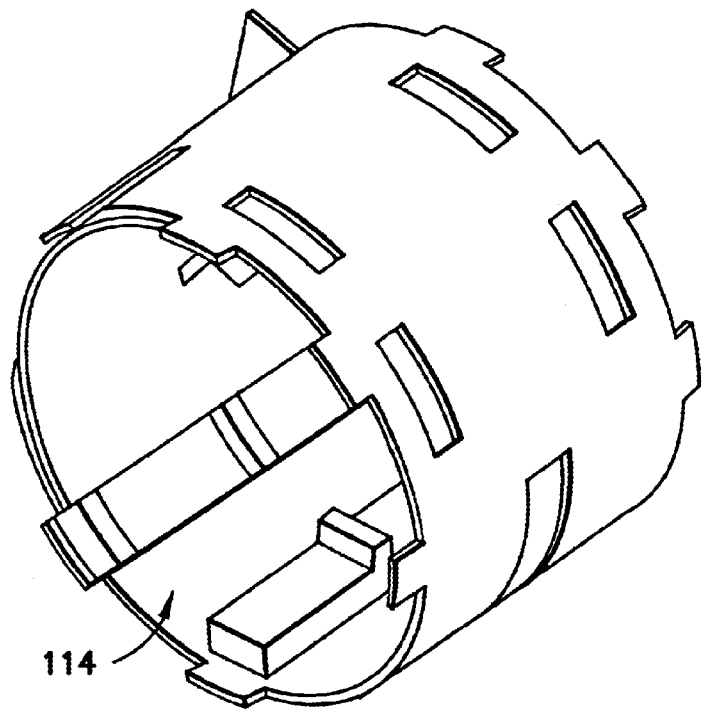
FIG. 14(a) is a perspective schematic view of the spring support and flexible printed circuit board of embodiment of FIG. 13.

In FIG. 9b, a zoom system is shown using a pair of lens 61 and 62. This configuration would also be adaptable to a pair of drives as indicated above for movement in ranges 63 and 64 as shown in FIG. 9b. In these configurations, a second moveable support tube may be provided which is mounted for movement within the primary lens support tube 10. In general, to provide the zoom function, at least two groups of lenses are provided, one group for adjusting the zoom ration and another for compensating for changes in focus. A piezoelectric driven optical system for providing a zoom function is shown in FIGS. 13–15. There are myriad configurations of lens systems which can be adapted to a system of this invention depending on the needs of a particular application. The systems described herein are designed for applications where size, weight, and energy use need to be minimized.

In the multiple lens system of the embodiment shown in FIGS. 13–16, an optical system 101 is mounted directly to the main printed circuit board 122 which includes an image sensor (not shown). Optical system 101, as shown in FIGS. 13–15, consists of a second lens element 102 and a first lens element 103 with an infra red filter 104. Optical system 101 is mounted on moveable tube 110. In this configuration, moveable tube 110 is split into two sections, a front section 121 in which is mounted the first lens element 103 and a rear section 120 in which is mounted the second lens element. The sections of the moveable tube 110 are moveable with respect to each other. For example, front section 121 may be moveable on rear section 120, as shown in FIG. 15. Front section 121 may also be connected to a bellows 105 to provide a seal for the optical system 101.

Figure 14B:
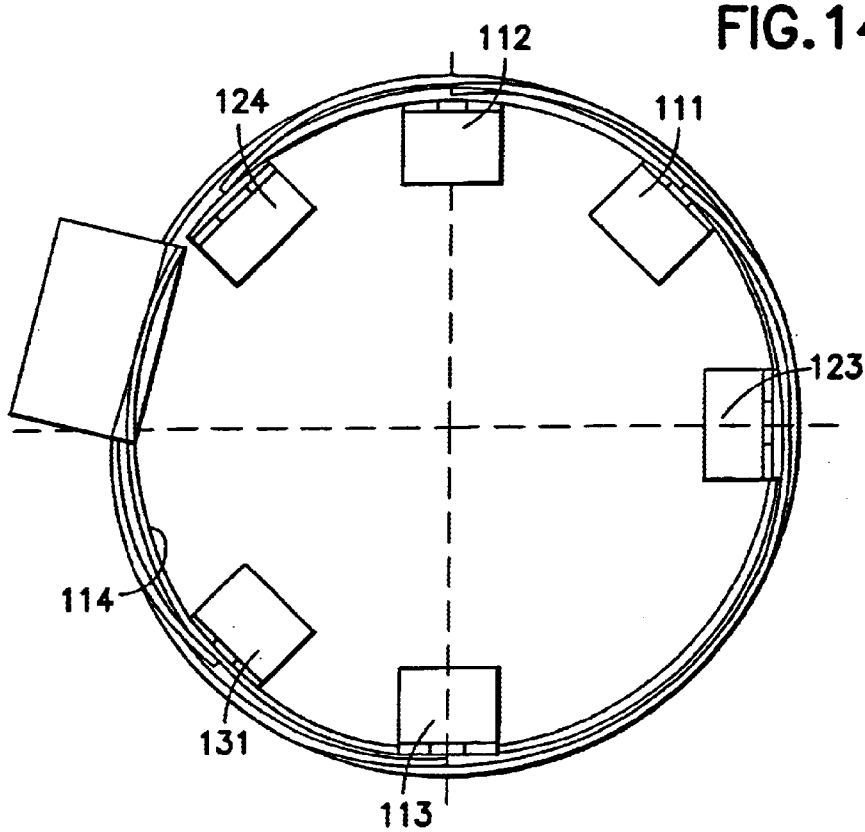
FIG. 14(b) is a schematic end view of the spring and flexible printed circuit board assembly of the embodiment of FIG. 13.

As shown in FIG. 14(b), each section of moveable tube 110 is driven independently by a pair of piezoelectric elements, piezoelectric elements 112 and 113 may power the rear section 120 and piezoelectric elements 111 and 131 may power the front section 121. To increase the effectiveness of the engagement with the piezoelectric drives, drive pad contact surfaces 125 and 126 are constructed on the front section 121 and rear section 120 respectively. The pads may be formed by alteration of the surface finish in the proper location.

Optical sensors, such as 123, may be provided in this embodiment for each of the sections 120 and. 121, mounted directly on the flexible printed circuit board 114. An opening 127 is constructed in the support tube 117 to provide optical exposure to reflective surface 76 on rear tube section 120.

In this manner a versatile drive mechanism is provided which fulfills the design requirements of space, power consumption and weight. It will be understood by those skilled in the art that various modifications and changes may be made to the above described embodiments without departure from the scope of the invention as defined in the claims.

What is claimed is:

1. An adjustable support for an optical system of a digital camera comprising:

a fixed tubular support having a longitudinal axis, said fixed tubular support being secured within said camera;

a moveable tubular support mounted for relative movement doaxially on the fixed tubular support;

a lens, mounted on the moveable tubular support in operative association with said optical system;

a flexible printed circuit board mounted on the fixed tubular support; and at least one piezoelectric element having at least two active volumes which are independently excitable, said at least one piezoelectric element mounted and connected to said flexible printed circuit board, said piezoelectric element being deformable in response to an applied voltage to engage the moveable support and move said support along said longitudinal axis.

2. An adjustable support for an optical system of a digital camera, as described in claim 1, wherein said piezoelectric element is constructed in the shape of a beam; said beam having a longitudinal axis and further comprising:

first and second piezoelectric sections, each constructed having at least two active volumes;

a passive part forming a fixed connection between said first and second piezoelectric sections, said piezoelectric sections extending longitudinally outward on either side of said passive part towards opposite ends;

an engagement pad extending outward from said passive part transverse to said longitudinal axis to provide a surface for engagement with said moveable tubular support; and wherein said beam is mounted on the fixed tubular support and said engagement surface is in operative contact with said moveable tubular support.

3. An adjustable support for an optical system of a digital camera, as described in claim 2, wherein said active volumes comprise at least two parallel layers of piezoelectric material connected by electrodes to a source of voltage, said electrodes connected to said applied voltage to provide independent excitation of said active volumes.

4. An adjustable support for an optical system of a digital camera, as described in claim 2, wherein said applied voltage is varied to cause a distortion of said piezoelectric beam into engagement with said moveable tubular support and further to cause distortion of said piezoelectric beam to provide axial movement.

5. An adjustable support for an optical system of a digital camera, as described in claim 4, wherein said voltage is varied according to a predetermined pattern.

6. An adjustable support for an optical system of a digital camera, as described in claim 1, wherein said moveable support tube is mounted within the fixed support tube for coaxial movement therein.

7. An adjustable support for an optical system of a digital camera, as described in claim 1, wherein said lens provides an autofocus function for the digital camera.

8. An adjustable support for an optical system of a digital camera, as described in claim 1, wherein said flexible printed circuit board is wrapped on said fixed tubular support and assumes a tubular shape consistent with said fixed tubular support.

9. An adjustable support for an optical system of a digital camera, as described in claim 8, wherein said flexible printed circuit board is wrapped on an outer surface of said fixed tubular support and further comprising:

a flexible resilient damping band wrapped on said fixed tubular support around said flexible printed circuit board; and a split band shaped spring element positioned over said damping band to hold said damping band and printed circuit board in place.

10. An adjustable support for an optical system of a digital camera, as described in claim 1, wherein said at least one piezoelectric element comprises a plurality of piezoelectric elements positioned symmetrically on the fixed tubular support.

11. An adjustable support for an optical system of a digital camera, as described in claim 1, wherein said at least one piezoelectric element comprises a plurality of piezoelectric elements positioned symmetrically on the outer surface of the fixed tubular support and wherein said piezoelectric elements engage said moveable tubular support through an access opening in said fixed tubular support.

12. An adjustable support for an optical system of a digital camera, as described in claim 1, wherein said piezoelectric element is constructed in the shape of a beam and is mounted on the fixed support, said beam extending parallel to said axis from said fixed support in a cantilever fashion towards a moveable end.

13. An adjustable support for an optical system of a digital camera, as described in claim 12, wherein said active volumes comprise at least two parallel layers of piezoelectric material separated by electrodes and extending from a fixed end to said moveable end, said electrodes connected to said applied voltage to provide independent excitation of said active volumes.

14. An adjustable support for an optical system of a digital camera, as described in claim 12, wherein said applied voltage is varied to cause a radial bending of said piezoelectric element into engagement with said moveable support and further to cause an expansion or contraction of said piezoelectric element to provide axial movement.

15. An adjustable support for an optical system of a digital camera, as described in claim 12, wherein said voltage is varied according to a predetermined pattern.

16. An adjustable support for an optical system of a digital camera, as described in claim 15, wherein the predetermined pattern of voltage is devised to move said moveable end of said piezoelectric element in an elliptical pattern.

17. An adjustable support for an optical system of a digital camera, as described in claim 12, wherein said at least one piezoelectric element comprises a plurality of piezoelectric elements positioned symmetrically on the support tube.

18. An adjustable support for an optical system of a digital camera, as described in claim 1, further comprising:

a second moveable tubular support mounted for movement on said moveable tubular support;

a second lens mounted on said second tubular support in operative association with said optical system to provide a zoom capability; and at least one auxiliary piezoelectric element having at least two active volumes which are independently excitable, said at least one auxiliary piezoelectric element secured to the moveable tubular support and extending between said moveable tubular support and said second moveable tubular support, said auxiliary piezoelectric element being deformable in response to an applied voltage to engage the second moveable support and move said second moveable support on said moveable support.

19. An adjustable support for an optical system of a digital camera, as described in claim 1, further comprising a position sensor mounted on the flexible printed circuit board for sensing the position of said moveable tube in order to provide a position reference to control the movement of said moveable tube.

20. An adjustable support for an optical system of a digital camera, as described in claim 19, wherein the position sensor comprises an optical sensor which senses reflected light from an optical scale on said moveable tube.

21. An adjustable support for an optical system of a digital camera comprising:

a fixed tubular support having a longitudinal axis, said fixed tubular support being secured within said camera;

a moveable tubular support mounted for relative movement coaxially on the fixed tubular support;

a lens, mounted on the moveable tubular support in operative association with said optical system;

at least one piezoelectric element constructed in the shape of a beam; said beam having a longitudinal axis, and first and second ends, said beam secured to the fixed tubular support close to said first and second ends, said beam further comprising:

first and second piezoelectric sections, each of said sections constructed having at least one active volume each, said piezoelectric sections being selectively deformable in response to an applied voltage to engage the moveable support and move said support along said longitudinal axis;

a passive part forming a fixed connection between said first and second piezoelectric sections, said piezoelectric sections extending longitudinally outward on either side of said passive part towards opposite ends;

an engagement pad extending outward from said passive part transverse to said longitudinal axis to provide a surface for engagement with said moveable tubular support; and wherein said beam is connected to the fixed tubular support in a manner that allows said engagement surface to be in operative contact with said moveable tubular support.

22. An adjustable support for an optical system of a digital camera, as described in claim 21, further comprising a flexible printed circuit board mounted on the fixed tubular support, wherein said at least one piezoelectric element is mounted directly on and connected to said flexible printed circuit board.

23. An adjustable support for an optical system of a digital camera, as described in claim 22, wherein said active volumes are connected to a voltage source by electrodes connected through said flexible printed circuit board.

24. An adjustable support for an optical system of a digital camera, as described in claim 22, further comprising:

a flexible resilient damping band wrapped on said fixed tubular support around said flexible printed circuit board; and a split band shaped spring element positioned over said damping band to hold said damping band and printed circuit board in place.

25. An adjustable support for an optical system of a digital camera system, as described in claim 21, wherein said at least one piezoelectric element comprises a plurality of piezoelectric elements positioned symmetrically on the support tube.

26. An adjustable support for an optical system of a digital camera, as described in claim 21, wherein said applied voltage is varied to cause a distortion of said piezoelectric beam into engagement with said moveable tubular support and further to cause distortion of said piezoelectric beam to provide axial movement.

27. An adjustable support for an optical system of a digital camera, as described in claim 26, wherein said voltage is varied according to a predetermined pattern.

28. An adjustable support for an optical system of a digital camera, as described in claim 21, wherein said flexible printed circuit board is wrapped on an outside surface of said fixed tubular support and assumes a tubular shape consistent with said fixed tubular support.

29. An adjustable support for an optical system of a digital camera, as described in claim 21, wherein said at least one piezoelectric element comprises a plurality of piezoelectric elements positioned symmetrically on the support tube.

30. An adjustable support for an optical system of a digital camera, as described in claim 21, wherein said at least one piezoelectric element comprises a plurality of piezoelectric elements positioned symmetrically on an outer surface of the fixed tubular support and wherein said plurality of piezoelectric elements engage said moveable tubular support through an access opening in said fixed tubular support.

31. A digital camera system comprising:

a main camera control circuit board, mounted in said camera;

an optical system mounted on said main printed circuit board to receive and process images;

an adjustable support for said optical system further comprising:

a fixed tubular support having a longitudinal axis, said fixed tubular support being mounted on said main printed circuit board;

a moveable tubular support mounted for relative movement coaxially on the fixed tubular support;

a lens, mounted on the moveable tubular support in operative association with said optical system;

a flexible printed circuit board mounted on the fixed tubular support; and at least one piezoelectric element having at least two active volumes which are independently excitable, said at least one piezoelectric element mounted and connected to said flexible printed circuit board, said piezoelectric element being deformable in response to an applied voltage to engage the moveable support and move said support along said longitudinal axis.

32. A digital camera system, as described in claim 31, wherein said at least one piezoelectric element is constructed in the shape of a beam; said beam having a longitudinal axis and further comprising:

first and second piezoelectric sections, each constructed having at least one active volume each;

a passive part forming a fixed connection between said first and second piezoelectric sections, said piezoelectric sections extending longitudinally outward on either side of said passive part towards opposite ends;

an engagement pad extending outward from said passive part transverse to said longitudinal axis to provide a surface for engagement with said moveable tubular support; and wherein said beam is mounted on the fixed tubular support and said engagement surface is in operative contact with said moveable tubular support.

33. A digital camera system, as described in claim 32, wherein said active volumes comprise at least two parallel layers of piezoelectric material connected by electrodes to said applied voltage to provide independent excitation of said active volumes.

34. A digital camera system, as described in claim 32, wherein said applied voltage is varied to cause a distortion of said piezoelectric beam into engagement with said moveable tubular support and further to cause distortion of said piezoelectric beam to provide axial movement.

35. A digital camera system, as described in claim 34, wherein said voltage is varied according to a predetermined pattern.

36. A digital camera system, as described in claim 32, further comprising a flexible printed circuit board mounted on the fixed tubular support, wherein said at least one piezoelectric element is mounted directly on and connected to said printed circuit board.

37. A digital camera system, as described in claim 36, wherein said flexible printed circuit board is wrapped on said fixed tubular support and assumes a tubular shape consistent with said fixed tubular support.

38. A digital camera system, as described in claim 37, wherein said flexible printed circuit board is wrapped on an outer surface of said fixed tubular support and further comprising:
- a flexible resilient damping band wrapped on said fixed tubular support around said flexible printed circuit board; and
- a split band shaped spring element positioned over said damping band to hold said damping band and printed circuit board in place.

39. A digital camera system, as described in claim 31, wherein said moveable support tube is mounted within the fixed support tube for coaxial movement therein.

40. A digital camera system, as described in claim 31, wherein said lens provides an autofocus function for the digital camera.

41. A digital camera system, as described in claim 31, wherein said at least one piezoelectric element comprises a plurality of piezoelectric elements positioned symmetrically on the fixed tubular support.

42. A digital camera system, as described in claim 31, wherein said at least one piezoelectric element comprises a plurality of piezoelectric elements positioned symmetrically on the outer surface of the fixed tubular support and wherein said at least one piezoelectric element engages said moveable tubular support through an access opening in said fixed tubular support.

43. A digital camera system, as described in claim 31, wherein said piezoelectric element is constructed in the shape of a beam and is mounted on the fixed support, said beam extending parallel to said axis from said fixed support in a cantilever fashion towards a moveable end.

44. A digital camera system, as described in claim 43, wherein said active volumes comprise at least two parallel layers of piezoelectric material separated by electrodes and extending from a fixed end to said moveable end, said electrodes connected to said applied voltage to provide independent excitation of said active volumes.

45. A digital camera system, as described in claim 43, wherein said applied voltage is varied to cause a radial bending of said piezoelectric element into engagement with said moveable support and further to cause an expansion or contraction of said piezoelectric element to provide axial movement.

46. A digital camera system, as described in claim 43, wherein said voltage is varied according to a predetermined pattern.

47. A digital camera system, as described in claim 46, wherein the predetermined pattern of voltage is devised to move said moveable end of said piezoelectric element in an elliptical pattern.

48. A digital camera system, as described in claim 43, wherein said at least one piezoelectric element comprises a plurality of piezoelectric elements positioned symmetrically on the inner surface of the support tube.

49. A digital camera system, as described in claim 31, further comprising:
- a second moveable tubular support mounted for movement on said moveable tubular support;
- a second lens mounted on said second tubular support in operative association with said optical system to provide a zoom capability; and
- at least one auxiliary piezoelectric element having at least two active volumes which are independently excitable, said at least one auxiliary piezoelectric element secured to the moveable tubular support and extending between said moveable tubular support and said second moveable tubular support, said auxiliary piezoelectric element being deformable in response to an applied voltage to engage the second moveable support and move said second moveable support on said moveable support.

50. A digital camera system comprising:
- a main camera control circuit assembled on a flexible circuit board,
- an optical system contained within said camera to receive and process images;
- an adjustable support for said optical system further comprising:
  - a fixed tubular support having a longitudinal axis, said fixed tubular support being secured within said camera, and wherein said flexible printed circuit board is mounted thereon;
  - a moveable tubular support mounted for relative movement coaxially on the fixed tubular support;
  - a lens, mounted on the moveable tubular support in operative association with said optical system;
  - at least one piezoelectric element constructed in the shape of a beam; said beam having a longitudinal axis, said beam secured to the fixed tubular support by said flexible printed circuit board and extending between said fixed tubular support and said moveable tubular support, said beam further comprising:
    - first and second piezoelectric sections, each of said sections constructed having at least two active volumes, which are independently excitable, said piezoelectric sections being selectively deformable in response to an applied voltage to engage the moveable support and move said support along said longitudinal axis;
    - a passive part forming a fixed connection between said first and second piezoelectric sections, said piezoelectric sections extending longitudinally outward on either side of said passive part towards opposite ends;
    - an actuating lever extending outward from said passive part transverse to said longitudinal axis to provide a surface for engagement with said moveable tubular support; and
    - wherein said beam is mounted on the fixed tubular support in a manner that allows said engagement surface to be in operative contact with said moveable tubular support.

51. A digital camera system, as described in claim 50, wherein said active volumes are connected to a voltage source by electrodes connected through said flexible printed circuit board.

52. A digital camera system, as described in claim 50, wherein said at least one piezoelectric element comprises a plurality of piezoelectric elements positioned symmetrically on the inner surface of the support tube.

53. A digital camera system, as described in claim 50, wherein said applied voltage is varied to cause a distortion of said piezoelectric beam into engagement with said moveable tubular support and further to cause distortion of said piezoelectric beam to provide axial movement.

54. A digital camera system, as described in claim 53, wherein said voltage is varied according to a predetermined pattern.

55. A digital camera system, as described in claim 50, wherein said flexible printed circuit board is wrapped on said fixed tubular support and assumes a tubular shape consistent with said fixed tubular support.

56. A digital camera system, as described in claim 55, wherein said flexible printed circuit board is wrapped on an outer surface of said fixed tubular support and further comprising:
- a flexible resilient damping band wrapped on said fixed tubular support around said flexible printed circuit board; and
- a split band shaped spring element positioned over said damping band to hold said damping band and printed circuit board in place.

57. A digital camera system, as described in claim 50, wherein said at least one piezoelectric element comprises a plurality of piezoelectric elements positioned symmetrically on an outer surface of the fixed tubular support and wherein said at least one piezoelectric element engages said moveable tubular support through an access opening in said fixed tubular support.

58. A digital camera system, as described in claim 50, further comprising:
- a second moveable tubular support mounted for movement on said moveable tubular support;
- a second lens mounted on said second tubular support in operative association with said optical system to provide a zoom capability; and
- at least one auxiliary piezoelectric element having at least two active volumes which are independently excitable, said at least one auxiliary piezoelectric element secured to the moveable tubular support and extending between said moveable tubular support and said second moveable tubular support, said auxiliary piezoelectric element being deformable in response to an applied voltage to engage the second moveable support and move said second moveable support on said moveable support.

59. An adjustable support for an optical system of a digital camera comprising:
- a fixed tubular support having a longitudinal axis, said fixed tubular support being secured within said camera;
- a moveable tubular support mounted for relative movement coaxially on the fixed tubular support;
- a flexible printed circuit board mounted on the fixed tubular support;
- wherein said moveable tubular support further comprises:
    - a front section and a rear section mounted on said fixed tubular support for both relative movement between said sections and for movement in tandem;
    - at least one first lens mounted on said front section for movement therewith;
    - at least one second lens mounted on said rear section for movement therewith; and
    - wherein said at least one first and second lenses optically cooperating to provide an optical function; and
- at least one first piezoelectric element having at least two active volumes which are independently excitable, said at least one first piezoelectric element mounted and connected to said flexible printed circuit board, said at least one first piezoelectric element being deformable in response to an applied voltage to engage said front section and move said front section along said longitudinal axis; and
- at least one second piezoelectric element having at least two active volumes which are independently excitable, said at least one second piezoelectric element mounted and connected to said flexible printed circuit board, said at least one second piezoelectric element being deformable in response to an applied voltage to engage said rear section and move said rear section along said longitudinal axis.

60. An adjustable support for an optical system of a digital camera, as described in claim 59, wherein said at least one first and second lenses cooperated to provide a zoom function.

61. An adjustable support for an optical system of a digital camera, as described in claim 59, wherein said at least one first lens is a zoom lens and said at least one second lens is a focus lens.

62. An adjustable support for an optical system of a digital camera, as described in claim 59, further comprising a first optical sensor mounted and connected to said flexible printed circuit board, said first optical sensor positioned to sense light reflected from a surface of said front section and a second optical sensor mounted and connected to said flexible printed circuit board, said second optical sensor positioned to sense light reflected from a surface of said rear section.

* * * * *